US009596600B2

(12) United States Patent
Hernandez et al.

(10) Patent No.: US 9,596,600 B2
(45) Date of Patent: Mar. 14, 2017

(54) SYSTEMS AND METHODS FOR GENERATING LOCATION BASED ENTITLEMENTS

(71) Applicant: THOMSON REUTERS GLOBAL RESOURCES, Baar (CH)

(72) Inventors: Jose Hernandez, Rosemount, MN (US); Adam Hornibrook, Eagan, MN (US); Darren Trzynka, Eagan, MN (US)

(73) Assignee: Thomson Reuters Global Resources UC, Baar (CH)

( * ) Notice: Subject to any disclaimer, the term of this patent is extended or adjusted under 35 U.S.C. 154(b) by 0 days.

(21) Appl. No.: 14/695,120

(22) Filed: Apr. 24, 2015

(65) Prior Publication Data

US 2015/0312762 A1    Oct. 29, 2015

Related U.S. Application Data

(60) Provisional application No. 61/984,334, filed on Apr. 25, 2014.

(51) Int. Cl.
| | |
|---|---|
| *H04B 7/00* | (2006.01) |
| *H04W 12/06* | (2009.01) |
| *H04W 4/00* | (2009.01) |
| *H04W 40/24* | (2009.01) |

(52) U.S. Cl.
CPC ........... *H04W 12/06* (2013.01); *H04W 4/008* (2013.01); *H04W 40/244* (2013.01)

(58) Field of Classification Search
CPC .... H04W 4/008; H04W 12/06; H04W 40/244
USPC .................................. 455/41.2–41.3
See application file for complete search history.

(56) References Cited

U.S. PATENT DOCUMENTS

| | | | | |
|---|---|---|---|---|
| 9,202,245 | B2 * | 12/2015 | Kostka | G06Q 30/0633 |
| 2009/0103501 | A1 * | 4/2009 | Farrag | H04W 74/02 |
| | | | | 370/337 |
| 2010/0082629 | A1 | 4/2010 | Davis et al. | |
| 2010/0286997 | A1 * | 11/2010 | Srinivasan | G06Q 50/22 |
| | | | | 705/2 |
| 2011/0055554 | A1 * | 3/2011 | Xiao | H04L 63/205 |
| | | | | 713/155 |
| 2011/0068892 | A1 | 3/2011 | Perkins et al. | |
| 2012/0284517 | A1 * | 11/2012 | Lambert | H04L 63/0823 |
| | | | | 713/169 |
| 2013/0007858 | A1 * | 1/2013 | Shah | H04L 63/0815 |
| | | | | 726/6 |

(Continued)

OTHER PUBLICATIONS

International Search Report and Written Opinion, Jul. 23, 2015.

*Primary Examiner* — Simon Nguyen

(57) ABSTRACT

The present disclosure is directed towards systems and methods for providing one or more security measures in Bluetooth low energy protocol environment, which comprises broadcasting a beacon signal, wherein the beacon signal comprises one or more temporal attributes and a proximity range. A request from an access device is received to authenticate the access device with the beacon signal and is subsequently authenticated with the beacon signal when the access device is within the proximity range. One or more content items are the transmitted to the access device in accordance with the one or more temporal attributes while the access device is authenticated with the beacon signal.

18 Claims, 5 Drawing Sheets

(56) References Cited

U.S. PATENT DOCUMENTS

| | | | |
|---|---|---|---|
| 2013/0065584 A1* | 3/2013 | Lyon | H04W 28/06 455/434 |
| 2013/0217333 A1 | 8/2013 | Sprigg et al. | |
| 2013/0257364 A1 | 10/2013 | Redding | |
| 2013/0297422 A1* | 11/2013 | Hunter | G06Q 30/0261 705/14.58 |
| 2014/0064245 A1* | 3/2014 | Abraham | H04W 72/10 370/331 |
| 2014/0074874 A1 | 3/2014 | Fraccaroli | |
| 2014/0089028 A1 | 3/2014 | Marshall et al. | |
| 2014/0089111 A1* | 3/2014 | Fernandez | G06Q 30/0633 705/15 |
| 2014/0364056 A1* | 12/2014 | Belk | H04B 5/0031 455/41.1 |
| 2014/0370879 A1* | 12/2014 | Redding | H04W 4/001 455/419 |
| 2015/0046560 A1* | 2/2015 | Alibakhsh | H04L 65/4076 709/217 |
| 2015/0215781 A1* | 7/2015 | Reed | H04L 9/3226 726/5 |
| 2015/0245382 A1* | 8/2015 | Park | H04W 74/0808 455/450 |
| 2015/0247913 A1* | 9/2015 | Messier | G01S 5/0027 340/539.13 |

* cited by examiner

SYSTEMS AND METHODS FOR GENERATING LOCATION BASED ENTITLEMENTS

CROSS-REFERENCE TO RELATED APPLICATION

This application claims priority to U.S. Provisional Application No. 61/984,334, filed Apr. 25, 2014, entitled "Systems and Methods for Generating Location Based Entitlements," the content of which is incorporated herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2015 Thomson Reuters.

TECHNICAL FIELD

This disclosure relates generally to data distribution security. More specifically, the disclosure is directed towards systems and methods for providing one or more security measures in a BLUETOOTH® Low Energy ("BLE") network.

BACKGROUND

With the advent of wireless communication technology becoming the mainstream focus in the our everyday lives, an increasing focus is being sent on establishing wireless communication protocols that limit the resources expended necessary to support such communications. Recently, one wireless communication protocol that has emerged in the wireless industry is BLUETOOTH® Low Energy, which is intended to provide considerably reduced power consumption and cost while maintaining a similar communication range as to classic BLUETOOTH®. While gaining momentum as a broadcast resource within a finite location, BLUETOOTH® Low Energy does have a significant drawback, lack of security. Specifically, the broadcast information from BLUETOOTH® Low Energy transmitter can easily be spoofed to another device as the advertisement frame is plainly visible to the world. The net result is that a receiving device may receive not only receive incorrect content, but damaging content in the form of a virus or the like, instead of the intended content from the intended BLUETOOTH® Low Energy transmitter. Accordingly, there exists a need for additional security measures when authenticating a BLUETOOTH® Low Energy with a receiving access device.

SUMMARY

The present disclosure is directed towards systems and methods for providing one or more security measures in Bluetooth low energy protocol environment. In one aspect, the computer implemented method includes broadcasting a beacon signal, wherein the beacon signal comprises one or more temporal attributes and a proximity range. A request from an access device is received to authenticate the access device with the beacon signal and is subsequently authenticated with the beacon signal when the access device is within the proximity range. One or more content items are the transmitted to the access device in accordance with the one or more temporal attributes while the access device is authenticated with the beacon signal.

According to one embodiment, the one or more temporal attributes comprises one or more of a rule defining a predefined time period before expiration and a rule defining a number of uses. In another embodiment, the computer implemented method further includes invalidating the authentication of the access device with the beacon signal in accordance with the one or more temporal attributes and removing the one or more content items from the access device upon the authentication of the access device with the beacon signal being invalidated.

According to another embodiment, authenticating the mobile device with the beacon signal when the access device is within the proximity range further comprises iteratively authenticating the mobile device with the beacon signal. According to another embodiment, authenticating the mobile device with the beacon signal when the access device is within the proximity range further comprises authenticating one or more beacon identification properties.

In another embodiment, authenticating the mobile device with the beacon signal when the access device is within the proximity range further comprises authenticating the location of a beacon device broadcasting the beacon signal. In yet another embodiment, authenticating the mobile device with the beacon signal when the access device is within the proximity range further comprises authenticating the location of the access device.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof and in which is shown by way of illustration specific embodiments in which the disclosure may be practiced. It is to be understood that other embodiments may be utilized and structural changes may be made without departing from the scope of the present disclosure.

Figure 1:
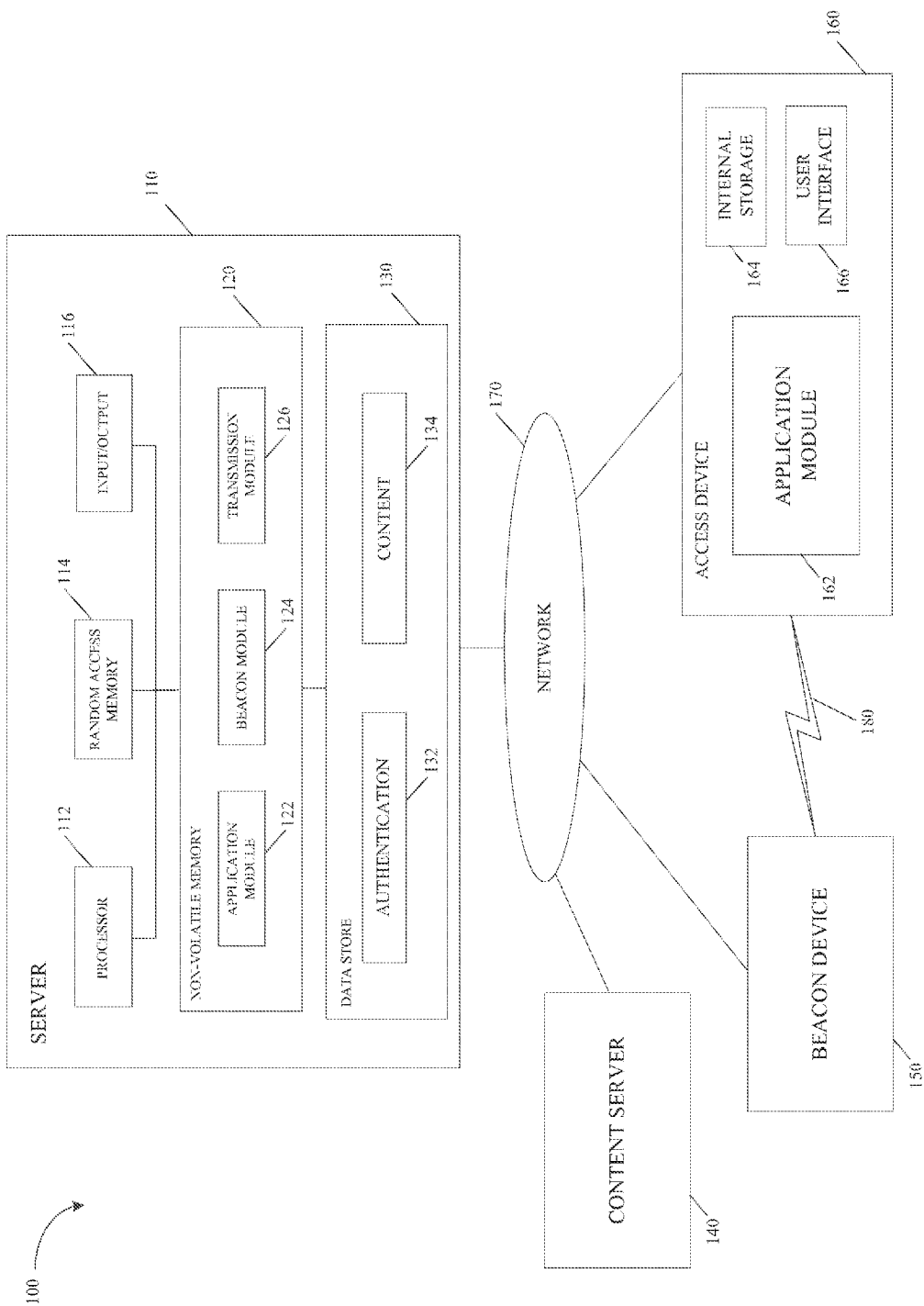
FIG. 1 is a schematic depicting an exemplary computer-based system for providing one or more security measures in a BLE network.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 100 includes a server 110 configured to include a processor 112, such as a central processing unit ("CPU"), random access memory ("RAM") 114, one or more input-output devices 116, such as a display device (not shown) and keyboard (not shown), non-volatile memory 120 and data store 130, all of which are interconnected via a common bus and controlled by the processor 112.

As shown in the FIG. 1 example, in one embodiment, the non-volatile memory 120 is configured to include an application module 122, a beacon module 124 and a transmission module 126. The application module 122 is configured to generate one or more applications that can be installed on the access device 160, receive BLE signal authentication requests from the access device 160, and work in conjunction with the beacon module 124 to verify beacon properties, beacon device locations and access device locations. According to one embodiment, the application module 122 is further configured to present a listing of available content items to the access device 160, manage requests for selected content items, and register content requests, beacon session requests, content item viewing and content item downloading.

According to one embodiment, the beacon module 124 is operative to configure the beacon device 150 response to one or more commands by an administrator utilizing the input/output facilities of the server 110. In one embodiment, the beacon module is configured to, in conjunction with the application module 122, verify beacon properties, beacon device locations and access device locations and authenticate the BLE signal 180 with the access device 160. According to one embodiment, the beacon module 124 is configured to monitor and evaluate content requests, beacon session requests, content item viewing and content item downloading. The transmission module 126 is configured serve as a gateway for the server 110 and is operative to receive from and transmit signals to the access device 160, the content server 140 and the beacon device 150. Additional details of modules 122, 124 and 126 are discussed in connection with FIGS. 2-5.

As shown in FIG. 1, in one embodiment, a network 170 is provided that can include various devices such as routers, server, and switching elements connected in an Intranet, Extranet or Internet configuration. In one embodiment, the network 170 employs wireless communication protocols to transfer information between an access device 160, the server 110, a data store 130, a content server 140 and a beacon device 150. For example, the network 170 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 170 may also be a Wide Area Network (WAN), such as the Internet, which employs one or more transmission protocols, e.g. TCP/IP. As another example, the network 170 may employ a combination of digital cellular standards and transmission protocols. In another embodiment, the network 170 uses wired communications to transfer information between the access device 160, the server 110, the data store 130, the content server 140 and the beacon device 150. In yet other embodiments, the network 170 may employ a combination of wired and wireless technologies to transfer information between the access device 160, the server 110, the data store 130, the content server 140 and the beacon device 150.

The data store 130 is a repository that maintains and stores information utilized by the before-mentioned modules 122, 124 and 126. In one embodiment, the data store 130 is a relational data store. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes an authentication data store 132 and a content data store 134. According to one embodiment, the authentication data store 132 is operative to store and maintain the beacon properties, including the beacon identification properties, location information, temporal attributes and iterative labeling for a respective beacon device. According to one embodiment, the content data store 134 maintains a listing of all available content items maintained in the content server 140 and having been designated as accessible on an access device when in the vicinity of the beacon device 150.

Although the data store 130 shown in FIG. 1 is shown as part of the server device 110, it will be appreciated by one skilled in the art that the data store 130 and/or any of the information shown therein, can be distributed across various servers and be accessible to the server device 110 over the network 170, be coupled directly to the server device 110, or be configured in an area of non-volatile memory 120 of the server device 110.

The access device 160, according to one embodiment, is a personal device, such as a personal wearable device, a Smartphone, tablet device or other personal digital assistant device. According to one embodiment, the access device 160 has user interface 166, an application module 162 and an internal storage component 164. Additionally, according to one embodiment, the access device 160 may have a plurality of sensors (not shown), an external storage component (not shown), a power management system (not shown), an audio component (not shown), audio input/output components (not shown), an image capture and process system (not shown), RF antenna (not shown) and a subscriber identification module (SIM) (not shown). The internal storage component 164 may include, for example, static random-access memory (SRAM) or Flash memory components. According to one embodiment, the application module 162 is configured to execute a stand-alone client application. In another embodiment, the application module 162 is configured to execute a web-based client application, such as a through web browser, which allows a user to access the data stored within data store 130 and the content server 140. Examples of web browsers are known in the art, such as MICROSOFT® INTERNET EXPLORER®, GOOGLE CHROME™, MOZILLA FIREFOX® AND APPLE® SAFARI®. According to another embodiment, the access device 160 may comprise a plurality of access devices, each of which comprise the same exemplary components as described herein.

The application module 162, according to one embodiment, is configured to execute a client application, which is rendered to a user on the user interface 166 of the access device 160. The application, according to one embodiment, is executed via the application module 162 and rendered on the user interface 166 when execution of the application is initiated. Execution of the application and rendering on a user interface are well known in the art. According to one embodiment, the application is written in one or more programming languages commonly used for application programming development, including but not limited to JAVA, C, C++, HTML, JavaScript, and Objective C.

According to one embodiment, the content server 140 is a general purpose or special purpose computing device comprising a user interface, an application module, transient and persistent storage devices, input/output subsystem and bus to provide a communications path between components comprising the general purpose or special purpose computer. According to one embodiment, the content server 140 comprises one or more databases containing one or more content items. A content item may consist of any type of electronic text, image or video data file. Exemplary content items may include book excerpts, articles, video snippets, coupons.

According to one embodiment, the beacon device 150 is a transmitter that uses BLUETOOTH® Low Energy ("BLE") wireless protocol to broadcast a BLE signal 180 that can be received by a compatible device, such as a Smartphone or tablet, which has BLE capability. The BLE wireless protocol, also referred to as BLUETOOTH® SMART, is part of the Bluetooth Core Specification Version 4.0. As is known in the art, mobile operating systems, such as APPLE® iOS® and ANDROID™, as well as well known operating systems APPLE® Mac OS®, LINUX®, and WINDOWS®, support the BLE wireless protocol.

According to one embodiment, the beacon device 150 is an IBEACON™ device powered by the APPLE® IBEACON™ technology, which is a commonly known technology that uses the BLE wireless protocol. As is known in the art, an IBEACON™ deployment consists of one or more IBEACON™ devices that transmit their own unique identification number to the local area, which takes the form of defined iBeacon prefix, followed by a variable proximity UUID, and a major, minor pair. Software on a receiving access device, such as a Smartphone or tablet running the APPLE® iOS® and ANDROID™ mobile operating system, can connect to the IBEACON™ device and perform various functions, such as notifying the user of its presence, notifying the user of available content or retrieving values from the IBEACON™ generic attribute profile ("GATT") service. As is also known in the art, IBEACON™ devices can take the form of a fixed transmitter, such as the ESTIMOTE™ beacon, or a mobile transmitter, such as a mobile device, such as a Smartphone or tablet running the APPLE® iOS® and ANDROID™ mobile operating system and having a BLE chipset. According to another embodiment, the beacon device 150 may comprise a plurality of beacon devices, each of which comprise the same exemplary components as described herein.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 2:
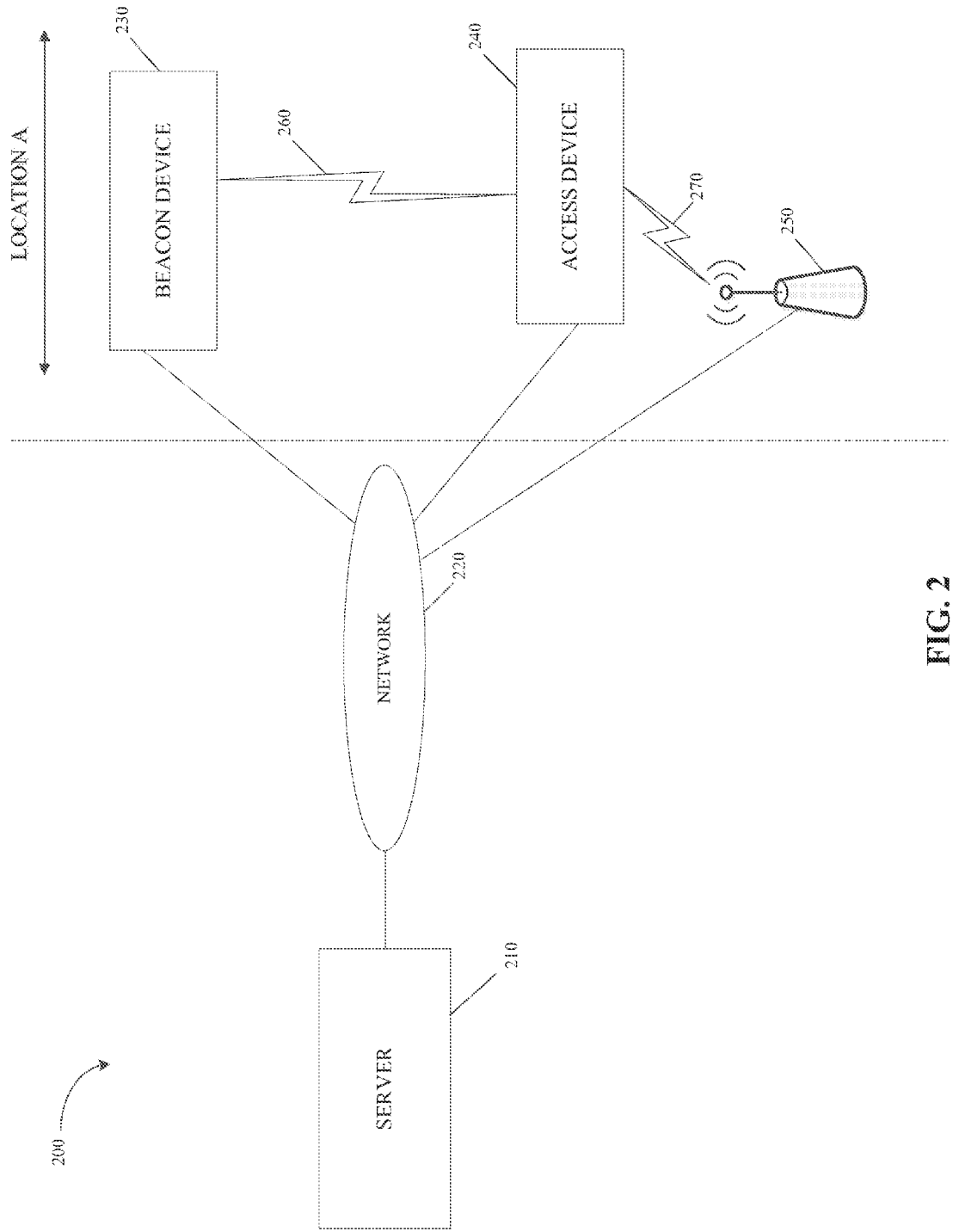
FIG. 2 is a schematic depicting an exemplary computer-based system for providing one or more security measures in a BLE network.

Turning now to FIG. 2, another example of a suitable computing system 100 within which embodiments of the disclosure may be implemented is presented. The computing system 200 is only one example and is not intended to suggest any limitation as to the scope of use or functionality of the disclosure. Neither should the computing system 200 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, etc. that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 2, the system 200 includes a server 210 configured to include a processor (not shown), RAM (not shown), one or more input-output devices (not shown), such as a display device (not shown) and keyboard (not shown), non-volatile memory (not shown) and data store (not shown), all of which are interconnected via a common bus and controlled by the processor.

As shown in FIG. 2, in one embodiment, a network 220 is provided that can include various devices such as routers, server, and switching elements connected in an Intranet, Extranet or Internet configuration. In one embodiment, the network 220 employs wireless communication protocols to transfer information between an access device 240, the server 210, a locator device 250 and a beacon device 230. For example, the network 220 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 220 may also be a Wide Area Network (WAN), such as the Internet, which employs one or more transmission protocols, e.g. TCP/IP. As another example, the network 220 may employ a combination of digital cellular standards and transmission protocols. In another embodiment, the network 220 uses wired communications to transfer information between the access device 240, the server 210, the locator device 250 and the beacon device 230. In yet other embodiments, the network 170 may employ a combination of wired and wireless technologies to transfer information between the access device 240, the server 210, the locator device 250 and the beacon device 230.

The access device 240, according to one embodiment, is a personal device, such as a personal wearable device, a Smartphone, tablet device or other personal digital assistant device. According to one embodiment, the access device 240 has user interface (not shown), an application module (not shown) and an internal storage component (not shown). Additionally, according to one embodiment, the access device 240 may have a plurality of sensors (not shown), an external storage component (not shown), a power management system (not shown), an audio component (not shown), audio input/output components (not shown), an image capture and process system (not shown), RF antenna (not shown) and a subscriber identification module (SIM) (not shown). The internal storage component of the access device 240 may include, for example, static random-access memory (SRAM) or Flash memory components. According to one embodiment, the application module of the access device 240 is configured to execute a stand-alone client application. In another embodiment, the application module of the access device 240 is configured to execute a web-based client application, such as a through web browser, which allows a user to access the data stored within the server 210 or other data sources connected to the network 220. Examples of web browsers are known in the art, such as MICROSOFT® INTERNET EXPLORER®, GOOGLE CHROME™, MOZILLA FIREFOX® AND APPLE® SAFARI®. According to another embodiment, the access device 240 may comprise a plurality of access devices, each of which comprise the same exemplary components as described herein.

The application module of the access device 240, according to one embodiment, is configured to execute a client application, which is rendered to a user on the user interface of the access device 240. The application, according to one embodiment, is executed via the application module of the access device 240 and rendered on the user interface 166 when execution of the application is initiated. Execution of the application and rendering on a user interface are well known in the art. According to one embodiment, the application is written in one or more programming languages commonly used for application programming development, including but not limited to JAVA, C, C++, HTML, JavaScript, and Objective C.

According to one embodiment, the beacon device 230 is a transmitter that uses BLUETOOTH® Low Energy ("BLE") wireless protocol to broadcast a BLE signal 260 that can be received by a compatible device, such as a Smartphone or tablet, which has BLE capability. The BLE wireless protocol, also referred to as BLUETOOTH® SMART, is part of the Bluetooth Core Specification Version 4.0. As is known in the art, mobile operating systems, such as APPLE® iOS® and ANDROID™, as well as well known operating systems APPLE® Mac OS®, LINUX®, and WINDOWS®, support the BLE wireless protocol.

For example, and according to one embodiment, the beacon device 230 is an IBEACON™ device powered by the APPLE® IBEACON™ technology, which is a commonly known technology that uses the BLE wireless protocol. As is known in the art, an IBEACON™ deployment consists of one or more IBEACON™ devices that transmit their own unique identification number to the local area, which takes the form of defined iBeacon prefix, followed by a variable proximity UUID, and a major, minor pair. Software on a receiving access device, such as a Smartphone or tablet running the APPLE® iOS® and ANDROID™ mobile operating system, can connect to the IBEACON™ device and perform various functions, such as notifying the user of its presence, notifying the user of available content or retrieving values from the IBEACON™ generic attribute profile ("GATT") service. As is also known in the art, IBEACON™ devices can take the form of a fixed transmitter, such as the ESTIMOTE™ beacon, or a mobile transmitter, such as a mobile device, such as a Smartphone or tablet running the APPLE® iOS® and ANDROID™ mobile operating system and having a BLE chipset.

In one embodiment, the locator device 250 is networking component that broadcasts a locator signal 270 to the access device 240. According to one embodiment, the locator device 250 is network component, such as a router, booster or other broadcasting device that is capable of broadcasting a Wi-Fi local area wireless signal as is known in the art. Accordingly, locator signal 270, according to the same embodiment, is a Wi-Fi local area wireless signal within 2.4 GHz UHF and 5 GHz SHF ISM radio bands as is known the art. In another embodiment, the locator device 250 is Global Positioning System ("GPS") satellite and the locator signal 270 is satellite broadcast signal in L1 to L5 bands as is known in the art. According to one embodiment, the beacon device 230, the access device 240 and the locator device 250 are in the same location A, wherein the locator device 250 is Wi-Fi network component broadcasting a local area Wi-Fi signal 270. In another embodiment (not shown), the locator device 250 is in a different location than the access device 240 and the beacon device 230, wherein the locator device 250 is GPS satellite and the locator signal 270 is a GPS satellite broadcast signal.

Further, it should be noted that the system 200 shown in FIG. 2 is only one embodiment of the disclosure. Other system embodiments of the disclosure may include additional structures that are not shown, such as secondary storage and additional computational devices. In addition, various other embodiments of the disclosure include fewer structures than those shown in FIG. 2. For example, in one embodiment, the disclosure is implemented on a single computing device in a non-networked standalone configuration. Data input and requests are communicated to the computing device via an input device, such as a keyboard and/or mouse. Data output, such as the computed significance score, of the system is communicated from the computing device to a display device, such as a computer monitor.

Figure 3:
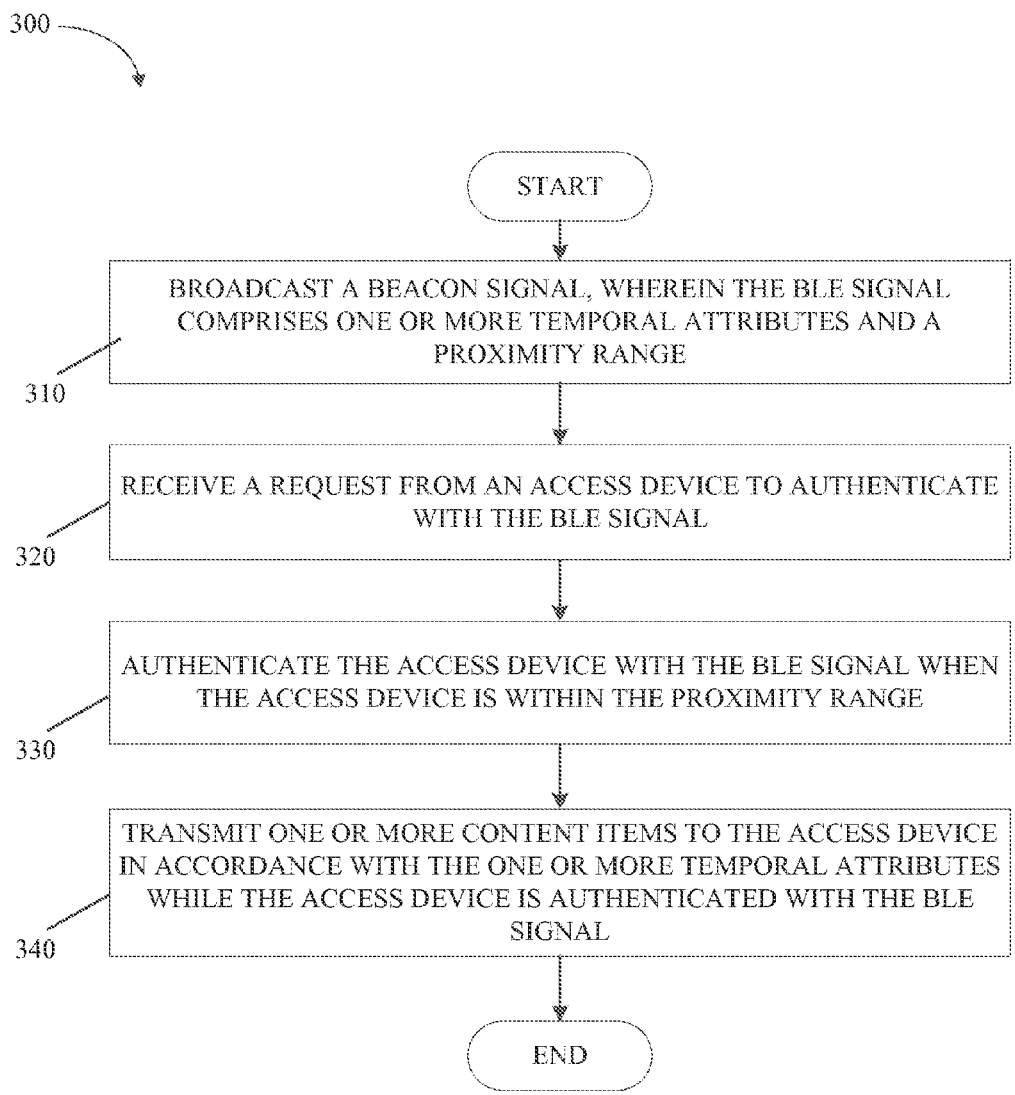
FIG. 3 is a flow diagram illustrating an exemplary computer-implemented method for providing content in a BLE network using one or more security measures.

Turning now to FIG. 3, an exemplary method 300 for providing content in a BLE network using one or more security measures is disclosed in the context of system 100 of FIG. 1. In the exemplary embodiment illustrated in FIG. 3, a BLE broadcast signal 180 is generated by the beacon device 150 and is received by the access device 160, wherein the BLE signal 180 comprises one or more temporal attributes and a proximity range, step 310. According to one embodiment, and as discussed previously, the beacon device 150 is an IBEACON™ device that can take the form of a fixed transmitter, such as the ESTIMOTE™ beacon, or a mobile transmitter, such as a mobile device, such as a Smartphone or tablet running the APPLE® iOS® and ANDROID™ mobile operating system and having a BLE chipset, such as the APPLE® IPHONE®.

In one embodiment, prior to the BLE broadcast signal being generated, the beacon device 150 is configured by the beacon module 124 of the server 110 in response to one or more commands by an administrator utilizing the input/output facilities of the server 110. In particular, the beacon module 124 configures the beacon properties of the beacon device 150 via the transmission module 126. Exemplary beacon properties include proximity range information, such as the unique identification number for the beacon device 150 to the local area, which includes the iBeacon prefix, followed by a variable proximity universally unique identifier ("UUID"), a major, minor pair and TX power value, as well as one or more temporal attributes, such as a time expiration period for the use of the beacon device 150 or a quantifiable number of uses of the beacon device 150.

According to one embodiment, the configuration of the beacon device 150 is performed by the beacon module 124 of the server 110 on an iterative or rolling basis. A rolling configuration of the beacon properties serves as one of the security measures afforded by the present invention. The rolling configuration, in one embodiment, is accomplished by the beacon module 124 of the server 110 automatically generating one or more beacon configuration properties on an iterative time basis, such as second, minute, hour or day. Each instance of the beacon properties, in addition to being transmitted to the beacon device, are also stored in the authentication data store 132 and associated with the respective beacon device 150 and its corresponding location.

Once the configuration is created is create by the beacon module 124, the beacon properties are transmitted to the beacon device 150 via the transmission module 126 and over the network 170. The beacon device 150 is then operable to transmit the BLE broadcast signal 180 within a specified area as defined by the proximity range set for in the beacon properties and as blown in the art. According to one embodiment, the beacon device 150 initiates broadcast of the BLE signal 180 in response to one or more user commands.

At step 320, the access device 160 generates a request to authenticate the BLE signal 180, which is received by the beacon module 124 via the transmission module 126. In one embodiment, and as discussed previously, the access device 160 is a personal device, such as a personal wearable device, a Smartphone, tablet device or other personal digital assistant device, executing the APPLE® iOS® mobile operating system, ANDROID™ mobile operating system, or other mobile operating system and has the capability to receive an IBEACON™ broadcast signal or other Bluetooth Low Energy signal. According to one embodiment, the application module 162 of the access device 160 executes a software application that is operative to identify the presence of a BLE signal. For example, a user having an IPHONE® at a trade show in the specified vicinity of a IBEACON™ device having executed a Smartphone application operative to identify the presence of an IBEACON™ signal, such as the THOMSON REUTERS PROVIEW eReader application, can receive a notification that an IBEACON™ signal is available. In one embodiment, in addition to providing an identification of the presence of a BLE signal, a listing of available content items is also displayed through the software application.

Subsequent to the executed software application on the access device 160 receiving a notification of the presence of the BLE signal 180, the application module 162 of the access device 160 sends an authentication request to the application module 122 of the server 110 over the network 170 via the transmission module 126. The authentication request, according to one embodiment, includes a request to authenticate and confirm the one or more beacon properties, which as discussed previously, includes the Beacon's own unique identification number to the local area, such as IBEACON™'s defined iBeacon prefix, followed by a variable proximity UUID, a major, minor pair, and TX Power value. The application module 122 of the server 110, upon receiving the authentication request, communicates with the beacon module 124 in order to verify and compare the one or more beacon properties in the authentication request to the one or more beacon properties maintained in the authentication data store 132 and associated with the respective beacon device 150 and its corresponding location. In one embodiment, the aforementioned authentication process occurs on an iterative basis when the beacon configuration is set to occur on a rolling basis. As described previously, the rolling configuration is accomplished by the beacon module 124 of the server 110 automatically generating one or more beacon configuration properties on an iterative time basis, such as second, minute, hour or day. Accordingly, the subsequent authentication of the beacon properties is also performed on an iterative time basis, on an interactive basis with the executed software application of the access device 160, or combination thereof.

Returning to FIG. 3, at step 330, the access device 160 is authenticated with the BLE signal 180 when the access device 160 is within the proximity range of the beacon device 150 upon confirmation by the application module 122 in conjunction with the beacon module 124 that the beacon properties of the authentication request are in fact the same as the beacon properties maintained in the authentication data store 132 and associated with the respective beacon device 150 and its corresponding location. Continuing from the previous example, the IPHONE® at the trade show while in the specified vicinity of a IBEACON™ device is authenticated with the IBEACON™ device when a back-end server confirms that the IBEACON™'s defined iBeacon prefix, followed by a variable proximity UUID, a major, minor pair, and TX Power value represented to the IPHONE® is the same as IBEACON™'s properties as recorded at the back-end server. In one embodiment, the authentication of the access device 160 with the BLE signal 180 is performed on an iterative basis when the beacon configuration is set to occur on a rolling basis.

Once authenticated, one or more content items are transmitted from the content server 140 to the access device 160 via the network 170 in accordance with the one or more temporal attributes while the access device 160 is authenticated with the BLE signal 180, step 340. In one embodiment, a listing of available content items is made available by the application module 122 of the server 110 to the application module 162 of the access device 160 over the network 170 via the transmission module 126. The listing of available content items, according to one embodiment, is made available by interrogating the content data store 134 to identify available content items maintained in the server 140 and have been identified as accessible an access device when in the vicinity of the beacon device 150. Continuing from the previous example, the IPHONE® at the trade show while in the specified vicinity of an IBEACON™ device receives a listing of marketing documents that has been previously set by an administrator as the listing of content that is to be made available to users at the trade show. In the example, the listing of marketing documents corresponding to a specific beacon device is maintained in a data store, such as the content data store 134 of the access device 110. Upon selection of a given content item, the application module 122 will send the request via the transmission module 126 over the network 170 to the content server 140, which in turn will transmit the selected content item over the network 170 to the access device 160. Further details regarding the one or more temporal attributes associated with the transmitted content item are discussed in connection with FIG. 5.

Figure 4:
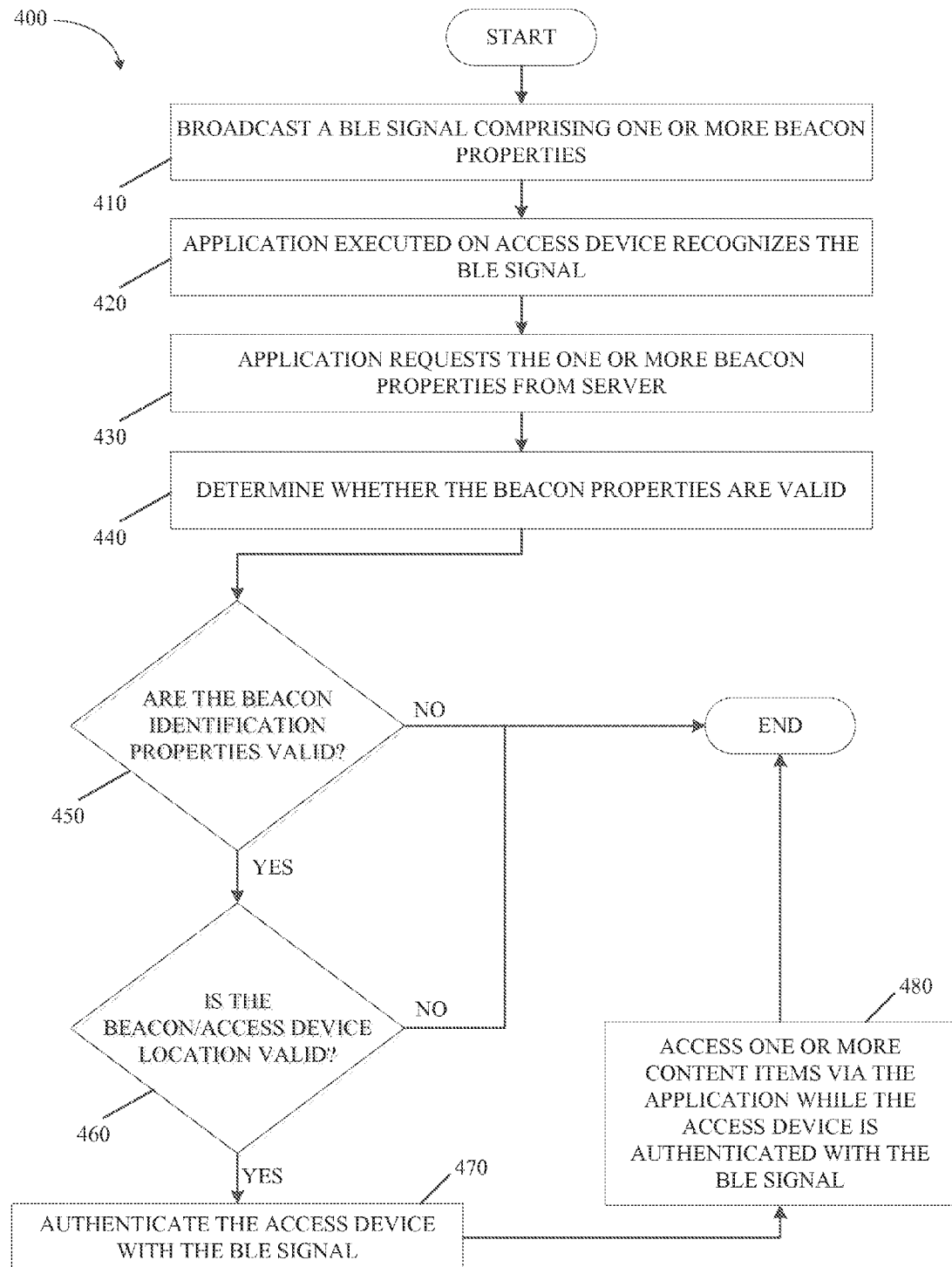
FIG. 4 is a flow diagram illustrating an exemplary computer-implemented method for providing one or more security measures in a BLE network.

Turning now to FIG. 4, an exemplary method 400 for providing content in a BLE network using one or more security measures is disclosed in the context of system 100 of FIG. 1. In the exemplary embodiment illustrated in FIG. 4, a previously configured BLE broadcast signal 180 comprising one or more beacon properties is broadcast by the beacon device 150, step 410. According to one embodiment, and as discussed previously, the beacon device 150 is an IBEACON™ device and the one or more beacon properties includes beacon properties include proximity range information, such as the unique identification number for the beacon device 150 to the local area, which includes the iBeacon prefix, followed by a variable proximity universally unique identifier ("UUID"), a major, minor pair and TX power value; one or more temporal attributes, such as a time expiration period for the use of the beacon device 150 or a quantifiable number of uses of the beacon device 150; a physical location of the beacon device 150, such as its GPS location; and a rolling configuration label if the beacon is intended to be automatically configured on an iterative basis.

At step 420, the application module 162 of the access device 160 having executed the application recognizes the presence of the broadcast BLE signal 180 and renders notification of the BLE signal 180 on the user interface 166. For example, a user having an IPHONE® in a book store or library in the specified vicinity of a IBEACON™ device having executed a Smartphone application operative to identify the presence of an IBEACON™ signal, such as the THOMSON REUTERS PROVIEW eReader application, can receive a notification in the application user interface that art IBEACON™ signal is available.

Returning to FIG. 4, at step 430, the application module 162 requests the one or more beacon properties from the beacon module 124 of the server 110. In one embodiment, the application module 162 of the access device 160 sends an authentication request to the application module 122 of the server 110 over the network 170 via the transmission module 126. The authentication request, according to one embodiment, includes a request to authenticate and confirm the one or more beacon properties, including the beacon device 150's own unique identification number to the local area, such as IBEACON™'s defined iBeacon prefix, followed by a variable proximity UUID, a major, minor pair, and TX Power value; one or more temporal attributes, such as a time expiration period or a limited quantifiable number of uses of the beacon device 150; the beacon device 150's physical location; or a rolling configuration label.

A determination is then made as to whether the one or more beacon properties are valid, step 440, In one embodiment, the one or more beacon properties are considered in two categories, beacon identification properties of the beacon device 150 and the beacon device 150's physical location. A determination is first made by the beacon module 124 as to whether the beacon identification properties are valid, step 450, The beacon identification properties, according to one embodiment, includes the beacon device 150's own unique identification number to the local area, as well as the rolling configuration label, if present, that identifies that the beacon will be authenticated on a rolling iterative basis. The application module 122 of the server 110, upon receiving the authentication request, communicates with the beacon module 124 in order to verify and compare the beacon identification properties in the authentication request to the beacon identification properties maintained in the authentication data store 132 and associated with the respective beacon device 150.

If the beacon identification properties are invalid, the process flow ends and the access device 160 will not be authenticated with the BLE signal 180. By contrast, if a determination is made that the beacon identification properties are valid, process flow continues to step 460. At step 460, a determination is made as to whether the location of the beacon device 150 and the access device 160 is valid. According to one embodiment, the beacon device 150's location comprises the beacon device 150's physical location, such as the latitudinal and longitudinal coordinates of the beacon device 150, determined using a Wi-Fi-based positioning system ("WPS"), Global Positioning System ("GPS") or the like. System 200 of FIG. 2 illustrates an exemplary system used to determine if a beacon device's location is valid. As discussed previously, in one embodiment, the locator device 250 is networking component that broadcasts a locator signal 270 to the access device 240. According to one embodiment, the locator device 250 is a network component such as a router, booster or other broadcasting device that is capable of broadcasting a Wi-Fi local area wireless signal as is known in the art. In another embodiment, the locator device 250 is GPS satellite and the locator signal 270 is satellite broadcast signal in L1 to L5 bands as is known in the art. In yet another embodiment, the locator device 250 comprises components of both a WPS and a GPS, or other like combination as is known in the art.

According to one embodiment, when the beacon module 124 makes a determination that the beacon identification properties are valid, the beacon module 124 identifies beacon device 150's anticipated physical location recorded in the authentication data store 132. The beacon device 150's anticipated physical location is recorded when the beacon device 150 first broadcasts the BLE signal 180. In one embodiment, when the beacon device 150 initially broadcasts the BLE signal 180, the beacon device also notes its physical location coordinates and whether it is located to a WPS or other local area network, and subsequently transmits that information to the beacon module 124 via the transmission module 126 over the network 170 to a network. The beacon module 124 in turn records the location information in the authentication data store 132 as being associated with the beacon device 150. Subsequent to the beacon module 124 verifying the beacon identification properties, the beacon module 124 identifies the beacon device ISO's anticipated physical location and its connection to the WPS, sends out a request via the transmission module 126 over the network 170 to a network to the network component at that, location to validate and confirm the access device 160 is in the physical location. In another embodiment, where the beacon device 150 is not connected to a local area network or cannot be located by a WPS, the GPS coordinates are used by the beacon module 124, which turn requests the GPS system to confirm that the access device 160 is in the physical location by confirm the GPS coordinates of the access device 160. In another embodiment, the location information of the access device 160, as GPS or WPD coordinates, for example, is sent to the server 110 when the authentication request is made and the beacon module 124 confirms the location of both the access device 160 and the beacon device 150.

Returning to FIG. 4, at step 470, if the beacon device 150 is not within proximity of the access device 160, the process flow ends and the access device 160 will not be authenticated with the BLE signal 180. By contrast, if a determination is made that the beacon device 150 is within proximity of the access device 160, the access device 160 will be authenticated with the BLE signal 180, step 470. At step 480, one or more content items are made accessible to the application by the application module 162 while the access device 160 is authenticated with the BLE signal 180.

Figure 5:
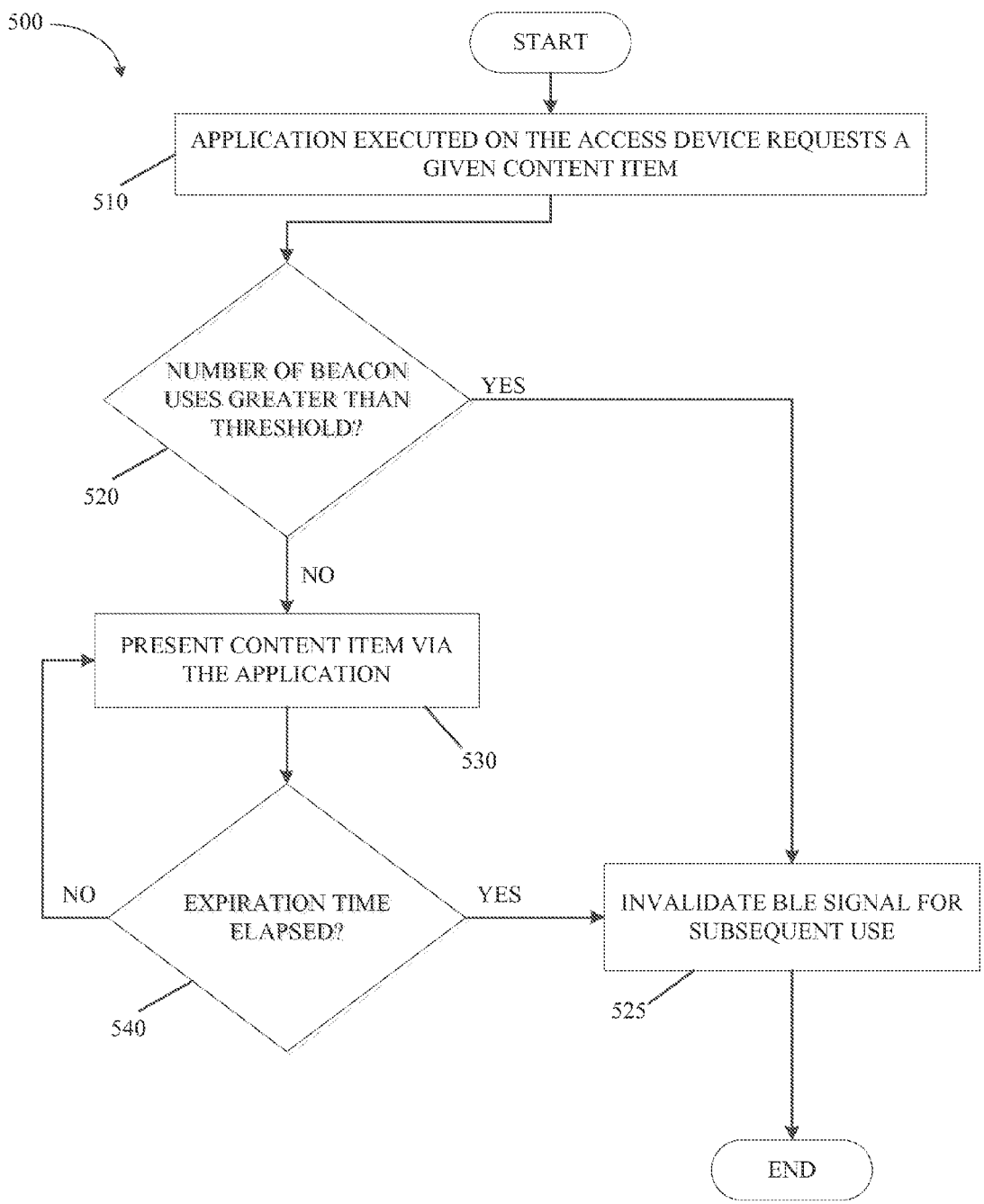
FIG. 5 is a flow diagram illustrating an exemplary computer-implemented method for providing one or more security measures in a BLE network.

Turning now to FIG. 5, an exemplary method 500 for providing content in a BLE network using one or more security measures is disclosed in the context of system 100 of FIG. 1. In the exemplary embodiment illustrated in FIG. 5, the application executed by the application module 162 of the access device 160 submits a request to the application module 122 via the transmission module 126 over the network 170 for a given content item available on content server 140 once the access device 160 is authenticated with the BLE signal 180, step 510. For example, a user having an IPHONE® in a book store or library that is authenticated with the BLE signal and having executed a Smartphone application, such as the THOMSON REUTERS PROVIEW eReader application, receives a notification of the availability of free reading materials such as sample book excerpts. According to one embodiment, and as discussed in connection with FIG. 3, the BLE signal is broadcast with one or more temporal attributes, such as a time expiration period for the use of the beacon device 150 or a quantifiable number of uses of the beacon device 150.

At step 520, a determination is made as to whether the number of beacon uses is greater than a threshold. In one embodiment, where the BLE signal is broadcast with the temporal attributes limiting the number of uses of the beacon device 150 to a threshold number, such as three beacon uses, the application module 122 will register each instance of the application module 162 of the access device 160 having made a request for a content item and compare the total number of instance the access device 160 has made a content item request to the threshold number of allowable content item requests set forth by an administrator and associated with the beacon device 150, which is recorded in the authentication data store 132. In another embodiment, the application module 122 will register each instance of a beacon device use session by the application module 162 of the access device 160 and compare the total number of a beacon device use sessions made initiated by the application module 162 and compare to the threshold number of allowable beacon device use sessions set forth by an administrator and associated with the beacon device 150, which is recorded in the authentication data store 132.

If it is determined that the number of beacon uses has exceeded the threshold, the BLE signal is invalidated for subsequent uses, step 525, and process flow ends. By contrast, if the number of beacon uses has not exceeded the threshold, process flow continues to step 530, the content item is presented to the access device 160. Further details concerning the transfer and presentation of content items on the access device were discussed previously in connection with FIGS. 1-4.

Returning to FIG. 5, process flow then continues to step 540, wherein a determination is made as to whether the expiration time for time expiration period for the use of the beacon device 150 has elapsed. According to one embodiment, the authentication of the BLE signal 180 to the access device 160 is set for a finite time period, whereby the beacon module 124 in conjunction with the application module 122 monitors the time by which the access device can remain authenticated to the BLE signal 180. The beacon module 124 begins monitoring time of the beacon use when the application module first receives a request from the access device 160 to authenticate the BLE signal 180 and identifies that the expiration time period set forth by an administrator for the beacon device 150 and maintained in the records within authentication module 132. While the access device 160 is authenticated with the BLE signal 180 within the allowable time period, process flow continues to step 530, where the content item continues to be presented to the access device 160. By contrast, if it is determined that the expiration time period has elapsed, process flow continues to step 525, wherein the BLE signal is invalidated and the presentation of the content item terminates.

According to one embodiment, the presentation of the one or more content items is accomplished through a web-based software application wherein the content items are not made available locally on the access device 160 but instead are viewed over the network 170. In another embodiment, the one or more content items are made available locally on the access device 160 and stored within internal storage 164 of the access device 160. With regard to the latter, and returning to FIG. 5, when one of the temporal attributes for invalidating the BLE signal are triggered, i.e. the expiration time period for the use of the beacon device 150 has elapsed or a quantifiable number of allowable uses of the beacon device 150 has been exhausted, the one or more content items stored locally within internal storage 164 of the access device 160 is removed from the access device though well-known method in the art, such as through use of self-destruct files, or deleted by the application module 162 in communication with the application module 122 once the beacon module 124 determines one of the temporal attributes having been triggered.

FIGS. 1 through 5 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method comprising:
broadcasting a beacon signal, wherein the beacon signal comprises one or more temporal attributes and a proximity range and complies with a Bluetooth low energy protocol; wherein the one or more temporal attributes comprises one or more of a rule defining a predefined time period before expiration and a rule defining a threshold number of beacon uses;
receiving a request from an access device to authenticate with the beacon signal;
authenticating the access device with the beacon signal when the access device is within the proximity range and determining whether a usage of the beacon by the access device does not exceed the threshold number of beacon uses;
authenticating a location of a beacon device broadcasting the beacon signal, wherein the detected location of a beacon corresponds to a location of record for the beacon; and
transmitting one or more content items to the access device in accordance with the one or more temporal attributes while the access device is authenticated with the beacon signal.

2. The computer-implemented method of claim 1, further comprising invalidating the authentication of the access device with the beacon signal in accordance with the one or more temporal attributes.

3. The computer-implemented method of claim 2, further comprising removing the one or more content items from the access device upon the authentication of the access device with the beacon signal being invalidated.

4. The computer-implemented method of claim 1, wherein authenticating the mobile device with the beacon signal when the access device is within the proximity range further comprises iteratively authenticating the mobile device with the beacon signal.

5. The computer-implemented method of claim 1, wherein authenticating the mobile device with the beacon signal when the access device is within the proximity range further comprises authenticating one or more beacon identification properties.

6. The computer-implemented method of claim 1, wherein authenticating the mobile device with the beacon signal when the access device is within the proximity range further comprises authenticating the location of the access device.

7. Non-transitory computer readable media comprising program code stored thereon for execution by a programmable processor to perform a method for providing one or more security measures in a Bluetooth low energy protocol environment, the computer readable media comprising:
program code for broadcasting a beacon signal, wherein the beacon signal comprises one or more temporal attributes and a proximity range and complies with the Bluetooth low energy protocol, wherein the one or more temporal attributes comprises one or more of a rule defining a predefined time period before expiration and a rule defining a threshold number of beacon uses;

program code for receiving a request from an access device to authenticate with the beacon signal;

program code for authenticating the access device with the beacon signal when the access device is within the proximity range and determining whether a usage of the beacon by the access device does not exceed the threshold number of beacon uses;

program code for authenticating a location of a beacon device broadcasting the beacon signal, wherein the detected location of a beacon corresponds to a location of record for the beacon; and program code for transmitting one or more content items to the access device in accordance with the one or more temporal attributes while the access device is authenticated with the beacon signal.

8. The computer readable media of claim 7, further comprising program code for invalidating the authentication of the access device with the beacon signal in accordance with the one or more temporal attributes.

9. The computer readable media of claim 8, further comprising program code for removing the one or more content items from the access device upon the authentication of the access device with the beacon signal being invalidated.

10. The computer readable media of claim 7, wherein program code for authenticating the mobile device with the beacon signal when the access device is within the proximity range further comprises program code for iteratively authenticating the mobile device with the beacon signal.

11. The computer readable media of claim 7, wherein program code for authenticating the mobile device with the beacon signal when the access device is within the proximity range further comprises program code for authenticating one or more beacon identification properties.

12. The computer readable media of claim 7, wherein program code for authenticating the mobile device with the beacon signal when the access device is within the proximity range further comprises program code for authenticating the location of the access device.

13. A system for performing a method for providing one or more security measures in a Bluetooth low energy protocol environment, the system comprising:

a beacon device configured to broadcast a beacon signal, wherein the beacon signal comprises one or more temporal attributes and a proximity range and complies with the Bluetooth low energy protocol, wherein the one or more temporal attributes comprises one or more of a rule defining a predefined time period before expiration and a rule defining a threshold number of beacon uses;

a server including a processor configured to:

receive a request from an access device to authenticate with the beacon signal;

authenticate the access device with the beacon signal when the access device is within the proximity range and determine whether a usage of the beacon by the access device does not exceed the threshold number of beacon uses;

authenticate a location of a beacon device broadcasting the beacon signal, wherein the detected location of a beacon corresponds to a location of record for the beacon; and transmit one or more content items to the access device in accordance with the one or more temporal attributes while the access device is authenticated with the beacon signal.

14. The system of claim 13, wherein the server is further configured to invalidate the authentication of the access device with the beacon signal in accordance with the one or more temporal attributes.

15. The system of claim 14, wherein the server is further configured to remove the one or more content items from the access device upon the authentication of the access device with the beacon signal being invalidated.

16. The system of claim 13, wherein the server in authenticating the mobile device with the beacon signal when the access device is within the proximity range is further configured to iteratively authenticate the mobile device with the beacon signal.

17. The system of claim 13, wherein the server in authenticating the mobile device with the beacon signal when the access device is within the proximity range is further configured to authenticate one or more beacon identification properties.

18. The system of claim 13, wherein the server in authenticating the mobile device with the beacon signal when the access device is within the proximity range is further configured to authenticate the location of the access device.

* * * * *